(12) United States Patent
Wu

(10) Patent No.: US 12,328,701 B2
(45) Date of Patent: Jun. 10, 2025

(54) INFORMATION TRANSMISSION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 479 days.

(21) Appl. No.: 17/878,352

(22) Filed: Aug. 1, 2022

(65) Prior Publication Data

US 2022/0394650 A1    Dec. 8, 2022

Related U.S. Application Data

(63) Continuation of application No. PCT/CN2020/076656, filed on Feb. 25, 2020.

(51) Int. Cl.
*H04W 72/231* (2023.01)
*H04B 7/185* (2006.01)
(Continued)

(52) U.S. Cl.
CPC .... *H04W 56/0045* (2013.01); *H04B 7/18513* (2013.01)

(58) Field of Classification Search
CPC ............. H04W 56/0045; H04W 72/23; H04W 72/0446; H04W 72/0453; H04W 74/0833; H04W 24/10; H04W 72/21; H04W 56/001; H04W 76/27; H04W 72/04; H04W 72/232; H04W 72/1268; H04W 72/20;
(Continued)

(56) References Cited

U.S. PATENT DOCUMENTS

2019/0150141 A1    5/2019  Irukulapati et al.
2021/0219246 A1*   7/2021  Xu ..................... H04W 52/146

FOREIGN PATENT DOCUMENTS

CN    101572577 A    11/2009
CN    105379147 A     3/2016
(Continued)

OTHER PUBLICATIONS

International Search Report and Written Opinion dated Oct. 16, 2020 in International Application No. PCT/CN2020/076656. English translation attached.
(Continued)

*Primary Examiner* — Khalid W Shaheed
(74) *Attorney, Agent, or Firm* — Sheppard, Mullin, Richter & Hampton LLP

(57) ABSTRACT

The present disclosure relates to an information transmission method, a terminal device and a network device. The method includes: receiving, by the terminal device, first indication information; and determining, by the terminal device, a first offset parameter value based on the received first indication information. The first offset parameter value is used to determine a timing relationship of transmission. With the embodiments of the present disclosure, communication between the network device and the terminal device can be achieved with accurate timing relationship.

19 Claims, 3 Drawing Sheets

(51) Int. Cl.
*H04W 56/00* (2009.01)
*H04W 84/06* (2009.01)

(58) Field of Classification Search
CPC ... H04W 72/046; H04W 48/12; H04W 24/02; H04W 72/044; H04W 72/1263; H04W 56/00; H04B 7/18513
See application file for complete search history.

(56) References Cited

FOREIGN PATENT DOCUMENTS

| | | |
|---|---|---|
| CN | 109327884 A | 2/2019 |
| CN | 110167133 A | 8/2019 |
| CN | 110535677 A | 12/2019 |
| CN | 110557782 A | 12/2019 |
| CN | 110637495 A | 12/2019 |
| CN | 110771240 A | 2/2020 |
| EP | 3297343 A2 | 3/2018 |
| EP | 3297343 A3 | 6/2018 |
| WO | 2019097922 A1 | 5/2019 |
| WO | 2019160737 A1 | 8/2019 |

OTHER PUBLICATIONS

3rd Generation Partnership Project; Technical Specification Group Radio Access Network; Solutions for NR to support non-terrestrial networks (NTN)(Release 16); 3GPP TR 38.821 V16.0.0 (Dec. 2019).
Extended European Search Report dated Dec. 7, 2022 received in European Patent Application No. EP20921170.5.
E Ericsson:"3GPP TSG-RAN WG1 Meeting#102-e Source: Moderator(Ericsson) Title :Feature lead summary on timing relationship enhancements Document for :Discussion "Agenda Item, Jan. 1, 2020(Jan. 1, 2020) ,XP055743390.
First Examination Report (FER) dated Nov. 23, 2022 received in Indian Patent Application No. IN202227045822. English Translation included.
The First Office Action from corresponding Chinese Application No. 202211090189.9, dated Aug. 16, 2023 . English translation attached.
Communication pursuant to Article 94(3) EPC for European application 20921170.5 mailed Sep. 8, 2023.
Thales, "Draft TR 38.821 v0.9.0"tsgr3_105bis, R3-196330, Nov. 19, 2019, full text.
ZTE Corporation et al., "Report of [107#60] [NR/NTN] RACH capacity evaluation and procedures (ZTE)"tsgr2_107bis, R2-1912664, Oct. 4, 2019, full text.
Thales et al:NR-NTN: TP for Chap 7.3 NR modifications to support NTN 3GPP Draft:RP-181394 Chap 7.3REV.3rd Generation Partnership Project(3GPP), Mobile Competence Centre:650.Route Des Lucioles :F-06921 Sophia Antipolis Cedex : France vol.TSG RAN, No. La Jolla, USA; Jun. 11, 2018-Jun. 14, 2018 Jun. 14, 2018(Jun. 14, 2018), XP051512027.
Japanese Office Action with English Translation for JP Application 2022-551048 mailed Nov. 7, 2023.
The Second Office Action from corresponding Chinese Application No. 202211090189.9, dated Dec. 6, 2023 . English translation attached.
Panasonic, Timing advance and RACH for NTN[online], 3GPP TSG RAN WG1 #98b R1-1911004, Internet<URL: https://www.3gpp.org/ftp/tsg_ran/WG1_RL1/TSGR1_98b/Docs/R1-1911004.zip>, Oct. 4, 2019.
Communication pursuant to Article 94(3) EPC for European application 20921170.5 mailed Mar. 11, 2024.
The Third Office Action from corresponding Chinese Application No. 202211090189.9, dated Mar. 7, 2024. English translation attached.
3GPP specs\archive Jan. 16, 2020"38821-g00",p. 58-61.
Zte et al."Discussion on the NR impacts on random access for NTN", 3GPP TSG RAN WG1 Meeting #92bis R1-1804236, Apr. 16, 2018.p. 1-3.
Thales et al,"NR-NTN: TP for Chap 7.3 NR modifications to support NTN"3GPP TSG RAN Meeting #80, RP-181394,Jul. 11, 2018,p. 10-11.
The Grant Notice from corresponding Chinese Application No. 202211090189.9, dated Apr. 29, 2024. English translation attached.
Shujing, Chen,"Research and performance analysis of time synchronization's algorithm in Rayleigh fading environment"Information Technology, 06, Jun. 25, 2009, full text.
Hearing Notice dated May 9, 2024 received in Indian Patent Application No. IN202227045822.
Extended European Search Report for EP Application No. 2515256.9 dated Mar. 5, 2025.

* cited by examiner

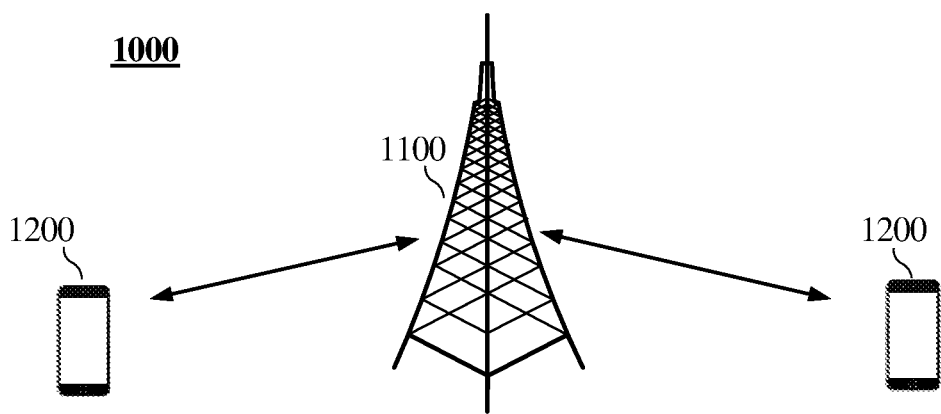
FIG. 1
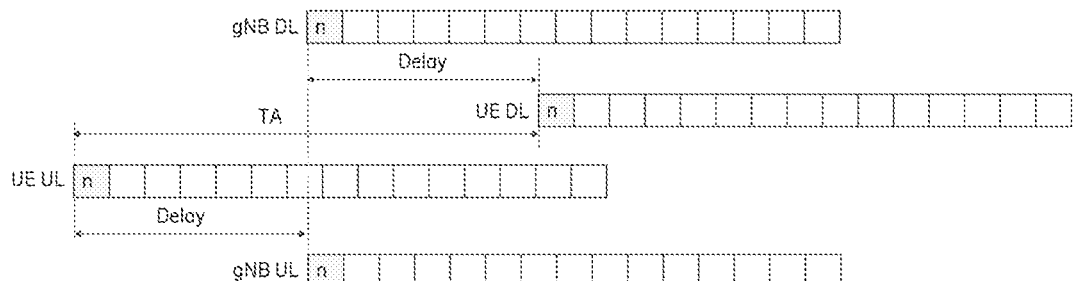
FIG. 2
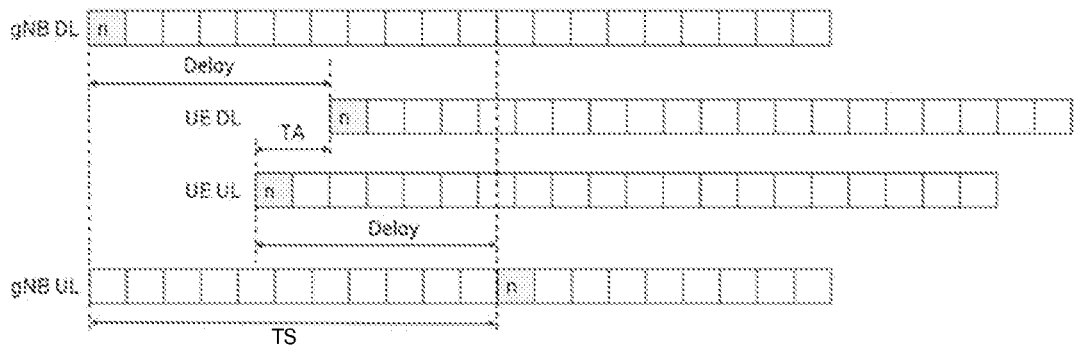
FIG. 3
S101
The terminal device receives first indication information.
S102
The terminal device determines a first offset parameter value based on the received first indication information, the first offset parameter value being used to determine a timing relationship of transmission.
FIG. 4

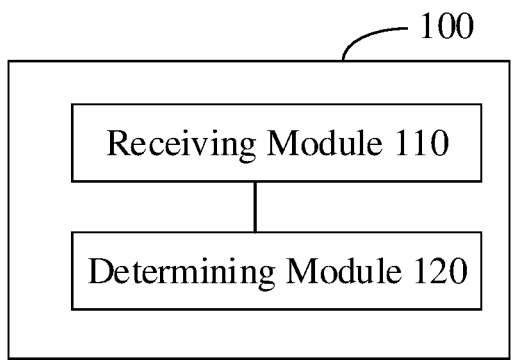
FIG. 5
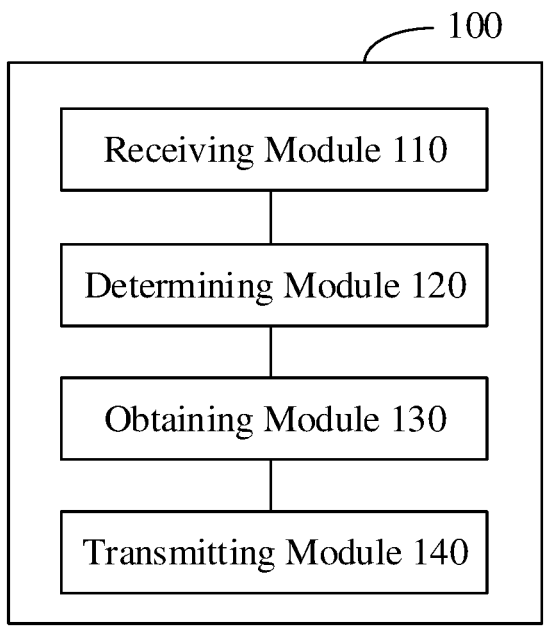
FIG. 6
FIG. 7

INFORMATION TRANSMISSION METHOD, TERMINAL DEVICE AND NETWORK DEVICE

CROSS-REFERENCE TO RELATED APPLICATIONS

The present application is a continuation of International Application No. PCT/CN2020/076656 filed on Feb. 25, 2020, which is hereby incorporated by reference in its entirety.

TECHNICAL FIELD

The present disclosure relates to communication technology, and more particularly, to an information transmission method, a terminal device, and a network device.

BACKGROUND

In a New Radio (NR) system of a terrestrial communication network, due to the round-trip propagation delay, a terminal device needs to consider the impact of Timing Advance (TA) when transmitting signals. For example, when the terminal device is scheduled to transmit on slot n, in order for the time at which the signal arrives at a network device to be the uplink slot n of the network device, the terminal device needs to transmit the signal in advance. Currently, in the NR system, terminal devices transmit signals according to a predetermined timing relationship.

In the terrestrial NR system, the propagation delay of the signal is usually smaller than 1 ms. In the Non Terrestrial Network (NTN) system, due to the long communication distance between the terminal device and the network device (such as a satellite), the propagation delay of the signal could be very high. In some specific NTN scenarios, the propagation delay can be in the order of hundreds of milliseconds. Since the signal propagation delay in the NTN system is greatly increased compared with the signal propagation delay in the terrestrial NR system, the timing relationship of information transmission in the terrestrial NR system cannot be applied to the NTN system, nor can it be applied to other application scenarios or other systems which are not NTN systems but have similar conditions.

SUMMARY

In view of this, the embodiments of the present disclosure provide an information transmission method, a terminal device, and a network device, such that the timing relationship of communication between the network device and the terminal device can be accurate.

An embodiment of the present disclosure provides an information transmission method. The method is applied in a terminal device and includes: receiving, by the terminal device, first indication information; and determining, by the terminal device, a first offset parameter value based on the received first indication information. The first offset parameter value is used to determine a timing relationship of transmission.

An embodiment of the present disclosure provides an information transmission method. The method is applied in a network device and includes: transmitting, by the network device, first indication information to a terminal device. The first indication information is used for the terminal device to determine a first offset parameter value based on the first indication information, and the first offset parameter value is used for the terminal device to determine a timing relationship of transmission.

An embodiment of the present disclosure further provides a terminal device. The terminal device includes: a receiving module configured to receive first indication information; and a determining module configured to determine a first offset parameter value based on the received first indication information. The first offset parameter value is used to determine a timing relationship of transmission.

An embodiment of the present disclosure further provides a network device. The network device includes: a transmitting module configured to transmit first indication information to a terminal device. The first indication information is used for the terminal device to determine a first offset parameter value based on the first indication information, and the first offset parameter value is used for the terminal device to determine a timing relationship of transmission.

In an embodiment of the present disclosure, a terminal device is provided. The terminal device includes a processor and a memory. The memory has a computer program stored thereon, and the processor is configured to invoke and execute the computer program stored in the memory to implement the above information transmission method.

In an embodiment of the present disclosure, a network device is provided. The network device includes a processor and a memory. The memory has a computer program stored thereon, and the processor is configured to invoke and execute the computer program stored in the memory to implement the above information transmission method.

In an embodiment of the present disclosure, a chip is provided. The chip includes a processor configured to invoke and execute a computer program from a memory, to enable a device provided with the chip to implement the above information transmission method.

In an embodiment of the present disclosure, a computer-readable storage medium is provided. The computer-readable storage medium has a computer program stored thereon. The computer program enables a computer to implement the above information transmission method.

In an embodiment of the present disclosure, a computer program product is provided. The computer program product includes computer program instructions that cause a computer to implement the above information transmission method.

In an embodiment of the present disclosure, a computer program is provided. The computer program causes a computer to implement the above information transmission method.

With the embodiments of the present disclosure, the network device can configure and/or indicate the offset parameter value for information transmission to the terminal device, and the terminal device can determine the offset parameter value according to the configuration and/or indication from the network device, and use the offset parameter value to determine the timing relationship of transmission, so as to achieve communication between network device and terminal device with accurate timing relationship.

BRIEF DESCRIPTION OF DRAWINGS

FIG. 1 is a schematic diagram showing a communication system architecture according to an embodiment of the present disclosure.

FIG. 2 is a schematic diagram showing a timing relationship between a terminal device and a network device.

FIG. 3 is a schematic diagram showing another timing relationship between a terminal device and a network device.

FIG. 4 is a schematic flowchart illustrating an information transmission method according to an embodiment of the present disclosure.

FIG. 5 is a schematic flowchart illustrating an information transmission method according to another embodiment of the present disclosure.

FIG. 6 is a schematic diagram showing a structure of a terminal device according to an embodiment of the present disclosure.

FIG. 7 is a schematic diagram showing a structure of a terminal device according to another embodiment of the present disclosure.

DESCRIPTION OF EMBODIMENTS

Figure 8:
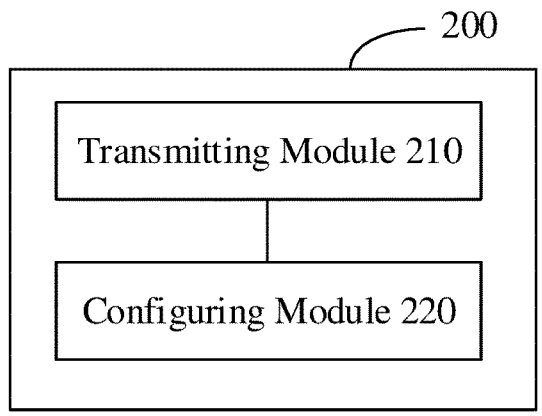
FIG. 8 is a schematic diagram showing a structure of a network device according to an embodiment of the present disclosure.

The technical solutions in the embodiments of the present disclosure will be described below with reference to the drawings in the embodiments of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, V2X communication, etc. The embodiments of the present disclosure can also be applied to these communication systems.

Optionally, the communication system of an embodiment of the present disclosure may also be applied to a Carrier Aggregation (CA) scenario, a Dual Connectivity (DC) scenario, a Standalone (SA) network deployment scenario, and the like.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a vehicle-mounted terminal device, a wireless terminal in self driving, a wireless terminal device in remote medical, a wireless terminal device in smart grid, a wireless terminal device in transportation safety, a wireless terminal device in smart city, a wireless terminal device in smart home, a wearable terminal device, etc. The terminal device involved in the embodiments of the present disclosure may also be referred to as terminal, User Equipment (UE), access terminal device, vehicle-mounted terminal, industrial control terminal, UE unit, UE station, mobile station, mobile, remote station, remote terminal device, mobile device, UE terminal device, wireless communication device, UE proxy or UE device, etc. The terminal device may be stationary or mobile.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, or a network device in a future evolved PLMN.

The network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided on a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

FIG. 1 exemplarily shows one network device 1100 and two terminal devices 1200. Alternatively, the wireless communication system 1000 may include multiple network devices 1100, and the coverage of each network device 1100 may include other numbers of terminal devices. The embodiment of the present disclosure is not limited to this.

Optionally, the wireless communication system 1000 as shown in FIG. 1 may also include other network entities such as Mobility Management Entity (MME) or Access and Mobility Management Function (AMF). The embodiment of the present disclosure is not limited to this.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In order to clearly illustrate the concepts of the embodiments of the present disclosure, the technical content related to the embodiments of the present disclosure will be briefly described first. In an NTN system or another communication system with a high propagation delay, there may be two cases in terms of the timing relationship between the terminal device and the network device.

Case 1: Referring to FIG. 2, the downlink (DL) slot is aligned with the uplink (UL) slot on the base station (gNB) side.

In this case, in order to align the uplink transmission of the UE on the terminal side with the uplink slot on the base station side, the UE needs to transmit in advance according to the TA value. The higher the propagation delay is, and the larger the TA will be accordingly. In the timing relationship of the NR system, the downlink slot and the uplink slot are also aligned on the base station side. Therefore, the transmission timing relationship in the NTN system can be determined with reference to the transmission timing relationship in the NR system by introducing an offset parameter.

Case 2: Referring to FIG. 3, there is an offset value TS between the downlink slot and the uplink slot on the base station (gNB) side.

In this case, in order to align the uplink transmission of the UE on the terminal side with the uplink transmission, the UE also needs to transmit in advance according to the TA value, which is relatively small. However, in this case, the base station side needs a complex scheduling scheme to process the transmission scheduling timing relationship. The information transmission timing relationship on the terminal side and the base station side can be enhanced by introducing an offset parameter.

Exemplarily, the timing relationship in the NR system may include one or more of the following cases:

Reception timing relationship of Physical Downlink Shared Channel (PDSCH): When the terminal device is scheduled by Downlink Control Information (DCI) to receive a PDSCH, the DCI includes indication information of $K_0$, where $K_0$ is used to determine the slot for transmitting the PDSCH. For example, if the scheduling DCI is received in slot n, the slot allocated for PDSCH transmission is slot $$\left\lfloor n \cdot \frac{2^{\mu_{PDSCH}}}{2^{\mu_{PDCCH}}} \right\rfloor + K_0,$$

where $K_0$ is determined based on the subcarrier spacing of the PDSCH, and $\mu_{PDSCH}$ and $\mu_{PDCCH}$ are used to determine the subcarrier spacings configured for the PDSCH and the Physical Downlink Control Channel (PDCCH), respectively. The value range of $K_0$ is 0 to 32.

Transmission timing relationship of Physical Uplink Shared Channel (PUSCH) scheduled by DCI: When the terminal device is scheduled by DCI to transmit a PUSCH, the DCI includes indication information of $K_2$, where $K_2$ is used to determine the slot for transmitting the PUSCH. For example, if the scheduling DCI is received in slot n, the slot allocated for PUSCH transmission is slot $$\left\lfloor n \cdot \frac{2^{\mu_{PUSCH}}}{2^{\mu_{PDCCH}}} \right\rfloor + K_2,$$

where $K_2$ is determined based on the subcarrier spacing of the PDSCH, $\mu_{PUSCH}$ and $\mu_{PDCCH}$ are used to determine the subcarrier spacings configured for the PUSCH and the PDCCH, respectively. The value range of $K_2$ is 0 to 32.

Transmission timing relationship of PUSCH scheduled by Random Access Response (RAR) grant: For the slot scheduled by an RAR grant for PUSCH transmission, if the terminal device initiates a Physical Random Access Channel (PRACH) transmission and then receives a PDSCH including the RAR grant message that has an end position at slot n, then the terminal device transmits the PUSCH in slot $n+K_2+\Delta$, where $K_2$ and $\Delta$ are determined according to a predetermined rule.

Transmission timing relationship of Hybrid Automatic Repeat-request Acknowledgement (HARQ-ACK) transmission on Physical Uplink Control Channel (PUCCH): For the slot of PUCCH transmission, if the end position of the received PDSCH is at slot n or the end position of the received PDCCH that indicates Semi-Persistent Scheduling (SPS) PDSCH release is at slot n, the terminal device shall transmit the corresponding HARQ-ACK information on the PUCCH resource within slot $n+K_1$, where $K_1$ is the number of slots and is indicated by the "PDSCH-to-HARQ-timing-indicator" information field in the DCI format, or provided by the dl-DataToUL-ACK parameter. If $K_1=0$, the last slot of the PUCCH transmission overlaps the slot for receiving the PDSCH or receiving the PDCCH indicating the SPS PDSCH release.

Activation timing relationship of Media Access Control (MAC)-Control Element (CE): When the HARQ-ACK information corresponding to a PDSCH including a MAC CE command is transmitted in slot n, the corresponding behavior indicated by the MAC CE command and the downlink configuration assumed by the terminal device shall take effect from the first slot after slot $n+3N_{slot}^{subframe,\mu}$, where $N_{slot}^{subframe,\mu}$ represents the number of slots included in each subframe for the subcarrier spacing configuration $\mu$.

Transmission timing relationship of Channel State Information (CSI) on PUSCH: The transmission timing relationship of CSI on PUSCH is generally the same as the transmission timing relationship of the PUSCH transmission scheduled by DCI.

CSI reference resource timing relationship: The CSI reference resource for reporting CSI on uplink slot n' is determined according to a single downlink slot $n-n_{CSI\_ref}$, where $$n = \left\lfloor n' \cdot \frac{2^{\mu_{DL}}}{2^{\mu_{UL}}} \right\rfloor,$$

and $\mu_{DL}$ and $\mu_{UL}$ are the subcarrier spacing configurations for downlink and uplink, respectively. The value of $n_{CSI\_ref}$ depends on the type of CSI reporting.

Transmission timing relationship of aperiodic channel Sounding Reference Signal (SRS): If the terminal device receives DCI in slot n for triggering transmission of an aperiodic SRS, the terminal device will transmit the aperiodic SRS in each triggered SRS resource set in slot $$\left\lfloor n \cdot 2^{\frac{\mu_{SRS}}{\mu_{PDCCH}}} \right\rfloor + k,$$

where k is configured by a high-layer parameter slotOffset in each triggered SRS resource set and is determined based on the subcarrier spacing corresponding to the triggered SRS transmission, and $\mu_{SRS}$ and $\mu_{PDCCH}$ are the subcarrier spacing configurations of the triggered SRS transmission and the PDCCH carrying the trigger command, respectively.

Optionally, the embodiments of the present disclosure use the offset parameter value $K_{offset}$ to enhance the timing relationship in the communication system, or apply the offset parameter value $K_{offset}$ to the timing relationship, such that in various communication scenarios, the communication between the network device and the terminal device can be performed with accurate timing relationship.

Exemplarily, the use of the offset parameter value $K_{offset}$ to enhance the timing relationship may include one or more of the following cases:

Transmission timing relationship of PUSCH scheduled by DCI (including CSI on PUSCH): If the terminal device receives the scheduled DCI in slot n, the slot used by the terminal device for PUSCH transmission is slot $$\left\lfloor n \cdot \frac{2^{\mu_{PUSCH}}}{2^{\mu_{PDCCH}}} \right\rfloor + K_2 + K_{offset}.$$

Transmission timing relationship of PUSCH scheduled by RAR grant: For a slot scheduled by an RAR grant for PUSCH transmission, the terminal device transmits the PUSCH on slot $n+K_2+\Delta+K_{offset}$.

Transmission timing relationship of HARQ-ACK transmission on PUCCH: For the slot of PUCCH transmission, the terminal device shall transmit the corresponding HARQ-ACK information on the PUCCH resource within the slot $n+K_1+K_{offset}$.

Activation timing relationship of MAC CE: When the HARQ-ACK information corresponding to the PDSCH including the MAC CE command is transmitted in slot n, the corresponding behavior indicated by the MAC CE command and the downlink configuration assumed by the terminal device shall take effect from the first slot after slot $n+XN_{slot}^{subframe,\mu}+K_{offset}$, where X may be determined by the UE capability of the NTN and the value may not be 3.

CSI reference resource timing relationship: The CSI reference resource for reporting CSI on uplink slot n' is determined according to a single downlink slot $n-n_{CSI_{ref}}-K_{offset}$.

Transmission timing relationship of aperiodic SRS: If the terminal device receives DCI in slot n for triggering transmission of an aperiodic SRS, the terminal device transmits the aperiodic SRS in each triggered SRS resource set in slot $$\left\lfloor n \cdot 2^{\frac{\mu_{SRS}}{\mu_{PDCCH}}} \right\rfloor + k + K_{offset}.$$

In practical applications, the network device needs to notify the terminal device of the value of the offset parameter value $K_{offset}$, and the terminal device can apply the offset parameter value $K_{offset}$ to the timing relationship after receiving and determining it. However, it still needs further research regarding how to determine and notify the value of $K_{offset}$.

To this end, an embodiment of the present disclosure provides an information transmission method, which is used in a terminal device to determine an offset parameter value, such that communication between the network device and the terminal device can be performed with accurate timing relationship.

FIG. 4 is a schematic flowchart of an information transmission method applied in a terminal device according to an embodiment of the present disclosure. The method includes at least part of the following content.

At S101, the terminal device receives first indication information.

At S102, the terminal device determines a first offset parameter value based on the received first indication information. The first offset parameter value is used to determine a timing relationship of transmission.

According to the information transmission method of the embodiment of the present disclosure, the terminal device can determine the first offset parameter value based on the indication from the network device, use the first offset parameter value to determine the timing relationship of transmission, and enhance the timing relationship in the communication system by introducing the offset parameter value, so as to achieve communication between the network device and the terminal device with accurate timing relationship.

FIG. 5 is a schematic flowchart illustrating an information transmission method applied in a network device according to an embodiment of the present disclosure. The method includes at least part of the following content.

At S201, the network device transmits first indication information to a terminal device.

Here, the first indication information is used for the terminal device to determine a first offset parameter value based on the first indication information, and the first offset parameter value is used for the terminal device to determine a timing relationship of transmission.

According to the information transmission method of the embodiment of the present disclosure, the network device can indicate the first offset parameter value to the terminal device via the first indication information, such that the terminal device can determine the timing relationship of transmission based on the first offset parameter value.

Optionally, in an embodiment of the present disclosure, the first offset parameter value may include a value of $K_{offset}$.

Optionally, in an embodiment of the present disclosure, the first offset parameter value may include an offset value between a downlink slot and an uplink slot that are associated with a same slot number at the network device side. For example, the first offset parameter value may include the value of the offset value TS between the downlink slot and the uplink slot on the base station (gNB) side in the above Case 2.

Optionally, in an embodiment of the present disclosure, the information transmission may be an uplink transmission, a downlink transmission, and/or a sidelink transmission.

Optionally, in an embodiment of the present disclosure, the first offset parameter value being used to determine the timing relationship of transmission may include at least one of: the first offset parameter value being used to determine the timing relationship of uplink transmission, the first offset parameter value being used to determine the timing relationship of downlink transmission, and the first offset parameter value being used to determine the timing relationship of sidelink transmission.

Optionally, the first indication information may be carried in at least one of Radio Resource Control (RRC) signaling, MAC CE, and DCI.

Optionally, the first indication information may be transmitted via a system message, e.g., a Master Information Block (MIB) message or a System Information Block (SIB) message.

Optionally, the first indication information may be transmitted over a Physical Broadcast Channel (PBCH), e.g., in the payload of the PBCH.

Optionally, the first indication information may be transmitted via a Random Access Response (RAR) grant message.

Optionally, the first indication information may be transmitted via a DCI for scheduling an RAR grant.

Optionally, the offset parameter may be in units of at least one of symbol, slot, subframe, half-frame, radio frame (or frame for short), millisecond, and second.

The terminal device in the embodiment of the present disclosure may determine the first offset parameter value based on the first indication information in various schemes, which will be described in detail below.

Scheme 1

In an embodiment of the present disclosure, the terminal device may determine, based on a first mapping, an offset parameter value corresponding to the first indication information as the first offset parameter value. The first mapping includes a correspondence between at least one indication information and at least one offset parameter value. Table 1 exemplarily shows the first mapping, which includes the correspondence between four entries of indication information and four offset parameter values.

TABLE 1

| Indication Information | Offset Parameter Value |
|---|---|
| 00 | Offset Parameter 0 |
| 01 | Offset Parameter 1 |
| 10 | Offset Parameter 2 |
| 11 | Offset Parameter 3 |

Here, if the first indication information is 00, the first offset parameter value is the offset parameter 0, or if the first indication information is 11, the first offset parameter value is the offset parameter 3.

Optionally, the first mapping may be predetermined or configured by a network device.

With the embodiment of Scheme 1, the terminal device can determine the first mapping, and after receiving the first indication information, determine the offset parameter value corresponding to the first indication information, so as to determine the timing relationship of transmission.

Scheme 2

In an embodiment of the present disclosure, the first indication information may include first parameter information, and the terminal device may determine, based on a determined second mapping, an offset parameter value corresponding to the first parameter information in the first indication information as the first offset parameter value. The second mapping may include a correspondence between at least one parameter information and at least one offset parameter value. For example, the first indication information may indicate a first parameter, and the terminal device may determine the first offset parameter value based on the first parameter.

Optionally, the second mapping may be predetermined or configured by a network device.

Optionally, the first parameter information may include at least one of the following types of parameters: subcarrier spacing, cell identification, beam identification, Synchronization Signal Block (SSB) identification, satellite scenario, satellite altitude, transmission type, whether a Radio Resource Control (RRC) parameter configuration is completed. Here, the terminal device is in an initial access stage before the RRC parameter configuration is completed, and is in a connected state after the RRC configuration is completed.

Optionally, the satellite scenario may include a at least one of a Low Earth Orbit (LEO) scenario, a Medium Earth Orbit (MEO) scenario, a Geostationary Earth Orbit (GEO) scenario, or a High Elliptical Orbit (HEO) scenario. Optionally, the satellite altitude may be 600 km or 1200 km. Optionally, the transmission type includes at least one of: Physical Uplink Shared Channel (PUSCH) transmission, Physical Uplink Control Channel (PUCCH) transmission, third-step message (MSG3) PUSCH transmission, Medium Access Control (MAC) Control Element (CE) command transmission, Channel State Information (CSI) reference resource, aperiodic channel Sounding Reference Signal (SRS) transmission, or Physical Random Access Channel (PRACH) transmission. Optionally, the CSI reference resource may refer to a resource used for CSI-RS transmission for CSI measurement or reporting.

Optionally, different first parameters may correspond to different second mappings. In particular, two examples will be given below for explanation.

Example 1: The first parameter information includes subcarrier spacing configuration information, and the second mapping is shown in Table 2.

TABLE 2

| Subcarrier Spacing Configuration µ | Offset Parameter Value |
|---|---|
| 0 | Offset Parameter 0 |
| 1 | Offset Parameter 1 |
| 2 | Offset Parameter 2 |
| 3 | Offset Parameter 3 |

Here, the subcarrier spacing configurations µ correspond to the values of the subcarrier spacings. For example, when µ is 0, the corresponding subcarrier spacing is 15 kHz, and when µ is 1, the corresponding subcarrier spacing is 30 kHz.

For example, the first parameter information indicates 0, and the terminal device determines, based on Table 2, that the offset parameter value is the offset parameter 0. Optionally, the subcarrier spacing configuration is a subcarrier spacing configuration of an uplink Bandwidth Part (BWP).

Example 2: The first parameter information includes configuration information of satellite scenario and satellite altitude, and the second mapping is shown in Table 3.

TABLE 3

| Satellite Scenario And Satellite Altitude | Offset Parameter Value |
|---|---|
| LEO 600 km | Offset Parameter 0 |
| LEO 1200 km | Offset Parameter 1 |
| GEO | Offset Parameter 2 |

For example, the first parameter information indicates that the satellite scenario is LEO and the satellite altitude is 600 km. Based on Table 3, the terminal device determines that the offset parameter value is the offset parameter 0. When the satellite altitude is 1200 km, the terminal device determines that the offset parameter value is the offset parameter 1.

As another example, the first parameter information indicates that the satellite scenario is GEO, and the offset parameter value is offset parameter 2. Here, the altitude of the GEO satellite is fixed (35786 km), so the GEO scenario only corresponds to the offset parameter 2 in the mapping table.

With the embodiment of Scheme 2, the terminal device can determine the second mapping, and after receiving the first indication information, obtain the first parameter information in the first indication information, and then determine the offset parameter value corresponding to the first parameter information, which is used to determine the timing relationship of transmission.

Scheme 3

In an embodiment of the present disclosure, the first indication information may include first jointly coded information, and the terminal device may determine, based on a third mapping, an offset parameter value corresponding to the first jointly coded information in the first indication information as the first offset parameter value.

The first jointly coded information is generated by jointly encoding values of parameters in a first parameter group. The first parameter group includes at least two types of parameters, and the at least two types of parameters include an offset parameter.

Here, the third mapping includes a correspondence between at least one jointly coded information and at least one value of each type of parameter in the first parameter group.

Optionally, in an embodiment of the present disclosure, since the first joint encoding information is generated by jointly encoding each parameter in the first parameter group, the value of each type of parameter in the first parameter group, including the offset parameter value, corresponding to the first joint encoding information can be obtained based on the third mapping.

For example, the first parameter group may include SSB identification (ID), subcarrier spacing, and offset parameter, and the third mapping is shown in Table 4.

TABLE 4

| Jointly Coded Information | SSB ID | µ | Offset Parameter Value |
|---|---|---|---|
| 000 | SSB ID 0 | 0 | Offset Parameter 0 |
| 001 | SSB ID 0 | 1 | Offset Parameter 1 |
| 010 | SSB ID 0 | 2 | Offset Parameter 2 |
| 011 | SSB ID 0 | 3 | Offset Parameter 3 |
| 100 | SSB ID 1 | 0 | Offset Parameter 4 |
| 101 | SSB ID 1 | 1 | Offset Parameter 5 |
| 110 | SSB ID 1 | 2 | Offset Parameter 6 |
| 111 | SSB ID 1 | 3 | Offset Parameter 7 |

Here, if the first indication information includes the jointly coded information 001, the terminal device can determine that the offset parameter value is the offset parameter 1 based on Table 4, and can also determine that the SSB identification is 0 and the subcarrier spacing configuration is 1. If the first indication information includes the jointly coded information 110, the terminal device can determine that the offset parameter value is the offset parameter 6 based on Table 4, and can also determine that the SSB identification is 1 and the subcarrier spacing configuration is 2.

In another example, the first parameter group may include transmission type and offset parameter, and the third mapping is shown in Table 5.

TABLE 5

| Jointly Coded Information | Transmission Type | Offset Parameter Value |
|---|---|---|
| 00 | PUSCH and/or PUCCH | Offset Parameter 0 |
| 01 | CSI reference resource and/or aperiodic SRS | Offset Parameter 1 |
| 10 | PRACH and/or MSG3 PUSCH | Offset Parameter 2 |
| 11 | MAC CE command | Offset Parameter 3 |

Here, if the first indication information includes the jointly coded information 00, the terminal device determines, based on Table 5, that the offset parameter is the offset parameter 0, and the transmission type is PUSCH and/or PUCCH.

In another example, the first parameter group may include cell identification, satellite scenario, satellite altitude, and offset parameter, and the third mapping is shown in Table 6.

TABLE 6

| Jointly Coded Information | Cell Identification | Satellite Scenario & Satellite Altitude | Offset Parameter Value |
|---|---|---|---|
| 00 | Cell 0 | LEO 1200 km | Offset Parameter 0 |
| 01 | Cell 1 | LEO 1200 km | Offset Parameter 1 |
| 10 | Cell 2 | GEO | Offset Parameter 2 |
| 11 | Cell 3 | GEO | Offset Parameter 3 |

Here, if the first indication information includes the jointly coded information 01, the terminal device determines, based on Table 6, that the offset parameter value is the offset parameter 1, the cell identification is 1, the satellite scenario is LEO, and the satellite altitude is 1200 km. Accordingly, the terminal device can determine that for Cell 1, the information of the network device includes the satellite scenario of LEO, the satellite altitude of 1200 km, and the offset parameter used to determine the timing relationship being the offset parameter of 1.

Optionally, the first parameter group may be predetermined or configured by a network device. Optionally, the third mapping may be predetermined or configured by a network device.

With the embodiment of Scheme 3, the terminal device can determine the third mapping, and after receiving the first indication information, obtain the first jointly coded information in the first indication information, and then determine the offset parameter value corresponding to the first jointly coded information, which is used to determine the timing relationship of transmission. Additionally, information of the parameters other than the offset parameter in the first jointly coded information can also be obtained.

Scheme 4

In an embodiment of the present disclosure, the terminal device may be configured with a plurality of parameter mapping tables each including a correspondence between a value of at least one type of parameter and at least one offset parameter value.

In order to notify the terminal device which parameter mapping table to select from the plurality of parameter mapping tables, in an embodiment of the present disclosure, the first indication information may include second parameter information. The second parameter information indicates that at least one mapping table (e.g., a first parameter mapping table) corresponding to the second parameter information is to be selected from the plurality of parameter mapping tables, and then the terminal device may determine the first offset parameter value according to the selected first parameter mapping table.

For example, the second parameter information includes a plurality of the second parameter values, and the plurality of mapping tables correspond to the plurality of the second parameter values, respectively. The terminal device selects a parameter mapping table corresponding to the second parameter value from the plurality of parameter mapping tables.

For example, the plurality of mapping tables may correspond to a plurality of satellite scenarios (e.g., LEO 600 scenario, LEO 1200 scenario, and GEO scenario), respectively, and the second parameter information may indicate that at least one of the plurality of mapping tables is to be selected, e.g., the second parameter information may indicate that the terminal device is to select the mapping table corresponding to the satellite scenario of the LEO 600 scenario.

Here, each mapping table includes a correspondence between at least one parameter information and at least one offset parameter value. The terminal device may determine the first offset parameter value based on the selected mapping table. For example, the selected parameter mapping table may include the correspondence between subcarrier spacing configurations and offset parameter values, and the terminal device can determine the corresponding offset parameter value based on the current subcarrier spacing configuration, as the first offset parameter value.

Further, in an embodiment of the present disclosure, the first indication information may further include third parameter information, which corresponds to an offset parameter value in at least one of the plurality of parameter mapping tables. If the terminal device selects a parameter mapping table corresponding to the second parameter value from the plurality of parameter mapping tables, it can further determine the first offset parameter value from the selected parameter mapping table based on the third parameter information.

For example, the second parameter information may indicate that the terminal device is to select the mapping table corresponding to the satellite scenario of the LEO 600 scenario, and the third parameter information may indicate the subcarrier spacing configuration 0, then the terminal device can determine, from the mapping table corresponding to the LEO 600 scenario, the first offset parameter value corresponding to the subcarrier spacing configuration 0.

Optionally, in an embodiment of the present disclosure, the first indication information may include third parameter information, which indicates that the first offset parameter value is to be determined from a first parameter mapping table. Optionally, the first parameter mapping table may correspond to the first offset parameter value. Here, the first parameter mapping table may be determined according to the second parameter information, or may be determined in other ways, such as predetermined or determined according to other parameters, and the embodiment is not limited to any of these examples.

Optionally, the plurality of parameter mapping tables may be predetermined or configured by a network device.

In an optional implementation, the plurality of parameter mapping tables may include a mapping table of a first satellite scenario and a mapping table of a second satellite scenario. Of course, when there are a larger number of configured satellite scenarios, more satellite scenario mapping tables may be included. Different parameter mapping tables correspond to different satellite application scenarios.

Exemplarily, Table 7-1, Table 7-2, and Table 7-3 show parameter mapping tables of three satellite scenarios, respectively.

TABLE 7-1

| Subcarrier Spacing Configurationμ (LEO 600 scenario) | Offset Parameter Value |
|---|---|
| 0 | Offset Parameter 0 |
| 1 | Offset Parameter 1 |
| 2 | Offset Parameter 2 |
| 3 | Offset Parameter 3 |

TABLE 7-2

| Subcarrier Spacing Configurationμ (LEO 1200 scenario) | Offset Parameter Value |
|---|---|
| 0 | Offset Parameter 4 |
| 1 | Offset Parameter 5 |
| 2 | Offset Parameter 6 |
| 3 | Offset Parameter 7 |

TABLE 7-3

| Subcarrier Spacing Configurationμ (GEO scenario) | Offset Parameter Value |
|---|---|
| 0 | Offset Parameter 8 |
| 1 | Offset Parameter 9 |
| 2 | Offset Parameter 10 |
| 3 | Offset Parameter 11 |

Here, Table 7-1 is the parameter mapping table corresponding to the LEO satellite scenario with an altitude of 600 km, Table 7-2 is the parameter mapping table corresponding to the LEO satellite scenario with an altitude of 1200 km, and Table 7-3 is the parameter mapping corresponding to the GEO satellite scenario. In this embodiment, after receiving the first indication information, the terminal device can determine to select, for example, Table 7-2 from the above three mapping tables according to the second parameter information in the first indication information, and determine the offset parameter value according to the subcarrier spacing configuration in Table 7-2. Alternatively, the terminal device can select, for example, Table 7-2 from the above three mapping tables according to other parameter information, such as the satellite scenario of the network device, and determine the offset parameter value according to the subcarrier spacing configuration in Table 7-2.

Further, optionally, the terminal device may obtain the current subcarrier spacing configuration μ, for example, if the current μ=1, then the first offset parameter may be determined as the offset parameter 5 according to the mapping in Table 7-2.

Optionally, the first indication information may include third parameter information, and the third parameter information may indicate a value of a subcarrier spacing configuration, for example, if μ=2, then the terminal device can determine the first offset parameter as the offset parameter 6 according to Table 7-2.

In another optional implementation, the plurality of parameter mapping tables may include a mapping table of a first cell and a mapping table of a second cell. Of course, when there are a larger number of configured cells, more cell mapping tables may be included. Different parameter mapping tables correspond to different cells.

Exemplarily, Table 8-1 and Table 8-2 show parameter mapping tables of two cells, respectively.

TABLE 8-1

| Subcarrier Spacing Configurationμ (Serving Cell) | Offset Parameter Value |
|---|---|
| 0 | Offset Parameter 0 |
| 1 | Offset Parameter 1 |
| 2 | Offset Parameter 2 |
| 3 | Offset Parameter 3 |

TABLE 8-2

| Subcarrier Spacing Configurationμ (Neighboring Cell) | Offset Parameter Value |
|---|---|
| 0 | Offset Parameter 4 |
| 1 | Offset Parameter 5 |

TABLE 8-2-continued

| Subcarrier Spacing Configurationμ (Neighboring Cell) | Offset Parameter Value |
|---|---|
| 2 | Offset Parameter 6 |
| 3 | Offset Parameter 7 |

In an embodiment, Table 8-1 and Table 8-2 may be tables configured by a network device. Here, Table 8-1 is a mapping table of a serving cell, and Table 8-2 is a mapping table of a neighboring cell.

Exemplarily, if the terminal currently needs to transmit an uplink signal or channel to the serving cell, it can select Table 8-1 as the first parameter mapping table. If the terminal is currently being handed over from the serving cell to the neighboring cell, it can select Table 8-2 as the first parameter mapping table. Further, the first offset parameter value may be determined from the selected table according to the third parameter information.

With the embodiment of Scheme 4, the terminal device can be configured with a plurality of parameter mapping tables, and after receiving the first indication information, obtain the second parameter information in the first indication information, select the parameter mapping table corresponding to the second parameter information, and then determine the corresponding offset parameter value according to the current value of the parameter corresponding to the parameter mapping table, so as to determine the timing relationship of transmission. Alternatively, the terminal device can obtain the third parameter information in the first indication information, and determine the offset parameter value corresponding to the third parameter information, in the selected parameter mapping table, so as to determine the timing relationship of transmission.

According to the cases described in Table 8-1 and Table 8-2 in the above Scheme 4, it can be seen that, with the embodiment of the present disclosure, the network device can indicate the offset parameter of the current cell to the terminal device of the current cell (i.e., the serving cell), and can also indicate the offset parameter of the neighboring cell to the terminal device of the current cell. The two cases will be described in detail below.

Case 1: Indicating the Offset Parameter of the Current Cell

In this embodiment, the terminal device first receives first indication information from a first network device. Here, the terminal device belongs to a first cell, and the first network device belongs to the first cell.

Second, the terminal device determines a first offset parameter value based on the received first indication information. The first offset parameter value includes an offset parameter value corresponding to the first cell;

Then, the terminal device performs uplink transmission, e.g., transmitting an uplink channel/signal, to the first network device according to the obtained first offset parameter value.

Thus, the first network device completes indicating of the offset parameter of the first cell to the terminal device of the first cell (i.e., the current cell, or the serving cell).

Case 2: Indicating the Offset Parameter of the Neighboring Cell

In this embodiment, the terminal device first receives first indication information from a first network device. Here, the terminal device belongs to a first cell, and the first network device belongs to the first cell.

Second, the terminal device determines a first offset parameter value based on the received first indication information. The first offset parameter value includes an offset parameter value corresponding to a second cell.

Then, the terminal device performs uplink transmission, e.g., transmitting an uplink channel/signal, to a second network device according to the obtained first offset parameter value. The second network device belongs to the second cell. Optionally, the first cell and the second cell are neighboring cells of each other.

For example, the terminal device is a terminal device in the first cell, the first network device is a network device in the first cell, and the second network device is a network device in the second cell. The first cell is the serving cell of the terminal device, and the second cell is a neighboring cell of the terminal device. The first network device transmits the offset parameter corresponding to the second cell to the terminal device, such that the terminal device can perform uplink transmission to the second network device according to the offset parameter, for example, performing a cell handover procedure according to the offset parameter.

Thus, the first network device completes indicating of the offset parameter of the second cell (i.e., the neighboring cell) to the terminal device of the first cell (i.e., the current cell or the serving cell).

Optionally, in an embodiment of the present disclosure, before the RRC parameter configuration is completed, the terminal device can determine the mapping according to a predetermined relationship, such as a protocol agreement. Alternatively, after the RRC parameter configuration is completed, the terminal device can determine the mapping according to the configuration parameters of the network device. Optionally, the mapping may include at least one of the first mapping, the second mapping, the third mapping, and the plurality of parameter mapping tables.

Optionally, in an embodiment of the present disclosure, before the RRC parameter configuration is completed, the terminal device can determine the first parameter group according to a predetermined relationship, such as a protocol agreement. Alternatively, after the RRC parameter configuration is completed, the terminal device can determine the first parameter group according to the configuration parameters of the network device.

In the above one or more embodiments of the present disclosure, optionally, when the first indication information indicates an offset parameter value, if the offset parameter value corresponds to a subcarrier spacing, the offset parameter value may be determined based on the subcarrier spacing.

Optionally, if the first offset parameter value is determined based on a first subcarrier spacing, the first offset parameter value is in units of slot or symbol.

Optionally, the offset parameter values in each mapping involved in the embodiments of the present disclosure may be configured according to Round Trip Time (RTT) of a cell. For example, the offset parameter may be determined from the maximum RTT and/or the minimum RTT of the cell. For example, the maximum RTT of the cell may be 40 ms, and the network device may determine the offset parameter value according to the RTT to be 4 radio frames, 8 radio half-frames or 40 subframes, where the length of a radio frame is 10 ms, the length of a radio half-frame is 5 ms, and the length of a subframe is 1 ms.

If the subcarrier spacing configuration information is that $\mu=0$, or the subcarrier spacing is 15 kHz, the offset parameter is 40 slots. Here, the length of one slot is 1 ms.

If the subcarrier spacing configuration information is that $\mu=1$, or the subcarrier spacing is 30 kHz, the offset parameter is 80 slots. Here, the length of one slot is 0.5 ms.

If the subcarrier spacing configuration information is that $\mu=2$, or the subcarrier spacing is 60 kHz, the offset parameter is 160 slots. Here, the length of one slot is 0.25 ms.

If the subcarrier spacing configuration information is that $\mu=3$, or the subcarrier spacing is 120 kHz, the offset parameter is 320 slots. Here the length of one slot is 0.125 ms.

In another example, the minimum RTT of the cell may be 55 ms, and the network device may determine the offset parameter according to the RTT to be 6 radio frames, 11 radio half-frames, or 55 subframes.

If the subcarrier spacing configuration is that $\mu=0$, the offset parameter is 55 slots.

If the subcarrier spacing configuration is that $\mu=1$, the offset parameter is 110 slots.

If the subcarrier spacing configuration is that $\mu=2$, the offset parameter is 220 slots.

If the subcarrier spacing configuration is that $\mu=3$, the offset parameter is 440 slots.

The specific settings and implementations of the embodiments of the present disclosure have been described above through various optional implementations from different perspectives. With at least one of the above embodiments, the terminal device can determine the first offset parameter value based on the indication from the network device, and use the first offset parameter value to determine the timing relationship of transmission. The timing relationship in the communication system can be enhanced by introducing the offset parameter value, such that the communication between the network device and the terminal device can be achieved with accurate timing relationship.

The implementation process of the information transmission method in the embodiment of the present disclosure will be described in detail below with reference to a number of specific examples.

Embodiment 1

In this embodiment, the terminal device is configured with two parameter mapping tables, as shown in Table 9-1 and Table 9-2. Here, Table 9-1 is the mapping table of the serving cell, including offset parameter values corresponding to four beams. Table 9-2 is the mapping table of the neighboring cell, including offset parameter values corresponding to two beams.

TABLE 9-1

| SSB ID (Serving Cell) | Offset Parameter Value |
|---|---|
| SSB ID 0 | $K_{offset0}$ |
| SSB ID 1 | $K_{offset1}$ |
| SSB ID 2 | $K_{offset2}$ |
| SSB ID 3 | $K_{offset3}$ |

TABLE 9-2

| SSB ID (Neighboring Cell) | Offset Parameter Value $K_{offset}$ |
|---|---|
| SSB ID 0 | $K_{offset4}$ |
| SSB ID 1 | $K_{offset5}$ |

The terminal device receives the first indication information transmitted by the first network device, and selects the parameter mapping table of the serving cell shown in Table 9-1 according to the first indication information. Then, since the beam corresponding to the current downlink communication between the terminal device and the first network device is a beam determined based on the SSB ID 1, it can be determined that the current SSB ID is the SSB ID 1, then the terminal device can determine that the first offset parameter value corresponding to the uplink communication with the first network device is $K_{offset1}$. Here, the first network device is a network device in the serving cell.

Accordingly, one or more of the following transmission timing relationships can be determined based on the first offset parameter value $K_{offset1}$:

Transmission timing relationship of PUSCH scheduled by DCI (including CSI transmitted on PUSCH): If the scheduling DCI is received on slot n, then the slot allocated for PUSCH transmission is slot $$\left\lfloor n \cdot \frac{2^{\mu_{PUSCH}}}{2^{\mu_{PDCCH}}} \right\rfloor + K_2 + K_{offset1}.$$

Transmission timing relationship of PUSCH scheduled by RAR grant: For the slot scheduled by an RAR grant for PUSCH transmission, the UE transmits the PUSCH on slot $n+K_2+\Delta+K_{offset1}$.

Transmission timing relationship of HARQ-ACK transmitted on PUCCH: For the slot of PUCCH transmission, the UE shall transmit the corresponding HARQ-ACK information on the PUCCH resource within slot $n+K_1+K_{offset1}$.

Activation timing relationship of MAC CE: When the HARQ-ACK information corresponding to the PDSCH including the MAC CE command is transmitted on slot n, the corresponding behavior indicated by the MAC CE command and the downlink configuration assumed by the UE shall take effect from the first slot after slot $n+XN_{slot}^{subframe,\mu}+K_{offset1}$, where X can be determined by the UE capability of NTN, and its value may not be 3.

CSI reference resource timing relationship: The CSI reference resource for reporting CSI on uplink slot n' is determined according to a single downlink slot $n-n_{CSI_{ref}}-K_{offset1}$.

Transmission timing relationship of aperiodic SRS: If the UE receives DCI triggering transmission of an aperiodic SRS on slot n, the UE transmits the aperiodic SRS in each triggered SRS resource set on slot $$\left\lfloor n \cdot 2^{\frac{\mu_{SRS}}{\mu_{PDCCH}}} \right\rfloor + k + K_{offset1}.$$

Embodiment 2

The configuration of the terminal device in this embodiment is similar to the configuration of the terminal device in Embodiment 1, including two parameter mapping tables shown in Table 9-1 and Table 9-2.

The difference from Embodiment 1 is that the terminal device of this embodiment selects the parameter mapping table of the neighboring cell shown in Table 9-2 according to the first indication information.

Then, according to the first indication information or other indication information transmitted by the first network device, the terminal device determines to transmit a PRACH on a PRACH resource corresponding to the SSB ID 0 of the second cell, and thus determines the first offset parameter value corresponding to the uplink communication with the second network device as $K_{offset4}$ corresponding to the SSB ID 0 in Table 9-2. Here, the second network device is a network device in the second cell.

Further, the terminal device transmits the PRACH to the second network device according to $K_{offset4}$. Here, $K_{offset4}$ may be the value of the offset parameter in Case 1, or $K_{offset4}$ may be the value of the offset value TS between the downlink slot and the uplink slot on the base station (gNB) side in Case 2.

Embodiment 3

In this embodiment, the terminal device searches for the SSB of the first cell, and determines a common Timing Advance (TA) of the first cell according to a system message transmitted by the first network device of the first cell.

Then, the terminal device transmits a PRACH to the first network device according to the TA.

After receiving the PRACH transmitted by the terminal device, the first network device transmits an RAR grant scheduled by first DCI to the terminal device. The first DCI includes the first indication information, or the RAR grant includes the first indication information.

Then, based on the first mapping, the terminal device determines the offset parameter value $K_{offset1}$ corresponding to the first indication information as the first offset parameter value.

Further, the terminal device transmits a MSG3 PUSCH on the PUSCH resource scheduled by the RAR grant according to the first offset parameter value $K_{offset1}$.

Embodiment 4

In this embodiment, the terminal device searches for the SSB of the first cell, and receives a system message transmitted by the first network device of the first cell. The system message includes the first indication information. The terminal device determines, based on the first mapping, the first offset parameter value $K_{offset0}$ corresponding to the first indication information as the offset parameter value of the first cell.

Then, the terminal device transmits a PRACH to the first network device according to the first offset parameter value $K_{offset0}$.

After receiving the PRACH transmitted by the terminal device, the first network device transmits an RAR grant scheduled by the first DCI to the terminal device.

Further, the terminal device transmits a MSG3 PUSCH on the PUSCH resource scheduled by the RAR grant according to the first offset parameter $K_{offset0}$.

Correspondingly to the at least one method applied in the terminal device according to the above embodiments, the embodiments of the present disclosure further provide one or more terminal devices. The terminal device(s) in the embodiments of the present disclosure may implement any one of the above methods.

Referring to FIG. 6, an embodiment of the present disclosure provides a terminal device 100. The terminal device 100 includes:

a receiving module 110 configured to receive first indication information;

a determining module 120 configured to determine a first offset parameter value based on the received first indication information. The first offset parameter value is used to determine a timing relationship of transmission.

Optionally, the determining module 120 may be configured to determine, based on a first mapping, an offset parameter value corresponding to the first indication information as the first offset parameter value. The first mapping may include a correspondence between at least one indication information and at least one offset parameter value.

Optionally, the first indication information may include first parameter information. The determining module 120 may be configured to determine, based on a second mapping, an offset parameter value corresponding to the first parameter information in the first indication information as the first offset parameter value. The second mapping may include a correspondence between at least one parameter information and at least one offset parameter value.

Optionally, the first indication information may include first jointly coded information. The determining module 120 may be configured to determine, based on a third mapping, an offset parameter value corresponding to the first jointly coded information in the first indication information as the first offset parameter value, and/or the network device may configure a first parameter group for the terminal device. The first jointly coded information is generated by jointly encoding values of parameters in the first parameter group. The first parameter group includes at least two types of parameters. The at least two types of parameters include an offset parameter. The third mapping includes a correspondence between at least one jointly coded information and at least one value of each type of parameter in the first parameter group.

Optionally, as shown in FIG. 7, the terminal device 100 may further include:

an obtaining module 130 configured to obtain the value of each type of parameter corresponding to the first jointly coded information based on the third mapping.

Optionally, the first parameter group may include an offset parameter. The first parameter group may further include at least one of the following types of parameters: subcarrier spacing, cell identification, beam identification, SSB identification, satellite scenario, satellite altitude, transmission type, whether an RRC parameter configuration is completed.

Optionally, the terminal device may be configured with a plurality of parameter mapping tables each including a correspondence between a value of at least one type of parameter and at least one offset parameter value. The first indication information may include second parameter information.

The determining module 120 may be configured to select a first parameter mapping table corresponding to the second parameter information from the plurality of parameter mapping tables; and determine the first offset parameter value according to the first parameter mapping table.

Optionally, the terminal device may be configured with a plurality of parameter mapping tables each comprising a correspondence between a value of at least one type of parameter and at least one offset parameter value. The first indication information may include third parameter information. The determining module 120 may be configured to determine the first offset parameter value from a first parameter mapping table based on the third parameter information.

Optionally, the plurality of parameter mapping tables may include a mapping table of a first cell and a mapping table of a second cell. Optionally, the plurality of parameter mapping tables may include a mapping table of a first satellite scenario and a mapping table of a second satellite scenario.

Optionally, the terminal device may belong to the first cell, a first network device may belong to the first cell, and the first indication information may be transmitted from the first network device.

As shown in FIG. 7, the terminal device 100 may further include:

a transmission module 140 configured to perform uplink transmission to the first network device based on the first offset parameter value.

Optionally, the terminal device may belong to a first cell, a first network device may belong to the first cell, and the first indication information may be transmitted from the first network device. A second network device may belong to a second cell, and the first offset parameter value may be an offset parameter value corresponding to the second cell.

The transmitting module 140 may be further configured to perform uplink transmission to the second network device based on the first offset parameter value.

On the other hand, correspondingly to the at least one method applied in the network device according to the above embodiments, the embodiments of the present disclosure further provide one or more network devices. The network device(s) in the embodiment of the present disclosure may implement any one of the above methods.

Referring to FIG. 8, an embodiment of the present disclosure provides a network device 200. The network device 200 includes:

a transmitting module 210 configured to transmit first indication information to a terminal device.

The first indication information is used for the terminal device to determine a first offset parameter value based on the first indication information, and the first offset parameter value is used for the terminal device to determine a timing relationship of transmission.

Optionally, the network device 200 may further include a configuring module 220.

Optionally, the configuring module 220 may be configured to configure a first mapping for the terminal device. The first mapping may include a correspondence between at least one indication information and at least one offset parameter value.

Optionally, the first indication information may include first parameter information. The configuring module 220 may be further configured to configure a second mapping for the terminal device. The second mapping may include a correspondence between at least one parameter information and at least one offset parameter value. The first parameter information may include at least one of the following types of parameters: subcarrier spacing, cell identification, beam identification, Synchronization Signal Block (SSB) identification, satellite scenario, satellite altitude, transmission type, whether a Radio Resource Control (RRC) parameter configuration is completed.

Optionally, the first indication information may include first jointly coded information. The configuring module 220 may be further configured to a third mapping for the terminal device. The third mapping may include a correspondence between at least one jointly coded information and at least one value of each type of parameter in a first parameter group.

The jointly coded information may be generated by jointly encoding values of parameters in the first parameter group.

The first parameter group may include an offset parameter. The first parameter group may further include at least one of the following types of parameters: subcarrier spacing, cell identification, beam identification, SSB identification, satellite scenario, satellite altitude, transmission type, whether an RRC parameter configuration is completed.

Optionally, the first indication information may include second parameter information. The configuration module 220 may be further configured to a plurality of parameter mapping tables for the terminal device. The second parameter information corresponds to at least one of the plurality of parameter mapping tables.

Optionally, the first indication information may further include third parameter information. The configuring module 220 may be further configured to configure a plurality of parameter mapping tables for the terminal device. The third parameter information corresponds to an offset parameter value in at least one of the plurality of parameter mapping tables.

Figure 9:
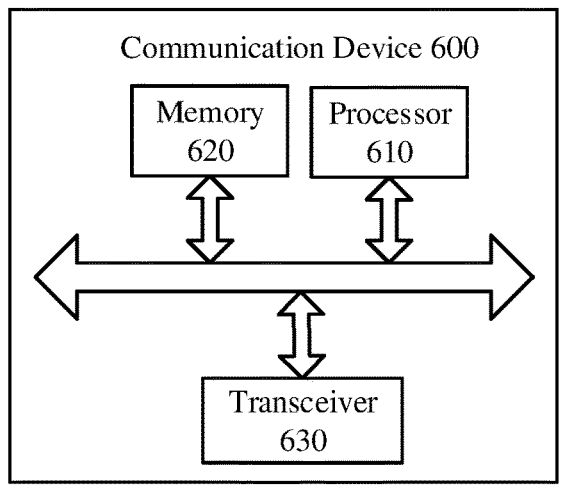
FIG. 9 is a schematic diagram showing a structure of a communication device according to an embodiment of the present disclosure.

FIG. 9 is a schematic diagram showing a structure of a communication device 600 according to an embodiment of the present disclosure. The communication device 600 includes a processor 610, and the processor 610 can invoke and execute a computer program from a memory to implement the method according to any of the embodiments of the present disclosure.

Optionally, the communication device 600 may further include a memory 620. The processor 610 can invoke and execute a computer program from the memory 620 to implement the method according to any of the embodiments of the present disclosure. Here, the memory 620 may be a separate device independent of the processor 610, or may be integrated in the processor 610.

Optionally, the communication device 600 may further include a transceiver 630. The processor 610 can control the transceiver 630 to communicate with other devices, and in particular to transmit information or data to other devices or receive information or data transmitted by other devices.

Here, the transceiver 630 may include a transmitter and a receiver. The transceiver 630 may further include one or more antennas.

Optionally, the communication device 600 may be the network device in the embodiment of the present disclosure, and the communication device 600 can perform corresponding procedures implemented by the network device in the method according to any of the embodiments of the present disclosure. Details thereof will be omitted here for simplicity.

Optionally, the communication device 600 may be the terminal device in the embodiment of the present disclosure, and the communication device 600 can perform corresponding procedures implemented by the terminal device in the method according to any of the embodiments of the present disclosure. Details thereof will be omitted here for simplicity.

Figure 10:
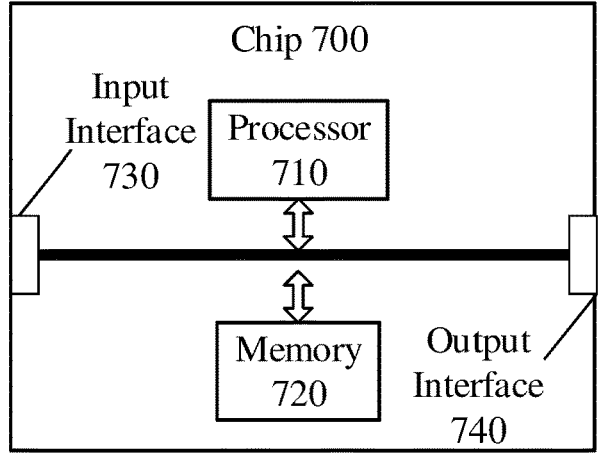
FIG. 10 is a schematic diagram showing a structure of a chip according to an embodiment of the present disclosure.

FIG. 10 is a schematic diagram showing a structure of a chip 700 according to an embodiment of the present disclosure. The chip 700 shown in FIG. 12 includes a processor 710, and the processor 710 can invoke and execute a computer program from a memory to implement the method in the embodiment of the present disclosure.

Optionally, the chip 700 may further include a memory 720. The processor 710 can invoke and execute a computer program from the memory 720 to implement the method in the embodiment of the present disclosure. Here, the memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the terminal device in the embodiment of the present disclosure as shown in FIG. 6, FIG. 7, or FIG. 9, and the chip can implement the corresponding process implemented by the terminal device in each method of the embodiment of the present disclosure. For the sake of brevity, details thereof will be omitted here.

It can be appreciated that the chip in the embodiment of the present disclosure may be referred to as a system-level chip, a system-chip, a chip system, or a system-on-chip.

The processor as described above can be a general purpose processor, a Digital Signal Processor (DSP), a Field Programmable Gate Array (FPGA), an Application Specific Integrated Circuit (ASIC), or another programmable logic device, a transistor logic device, or a discrete hardware component. The above general purpose processor may be a microprocessor or any conventional processor.

The memory as described above may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

Figure 11:
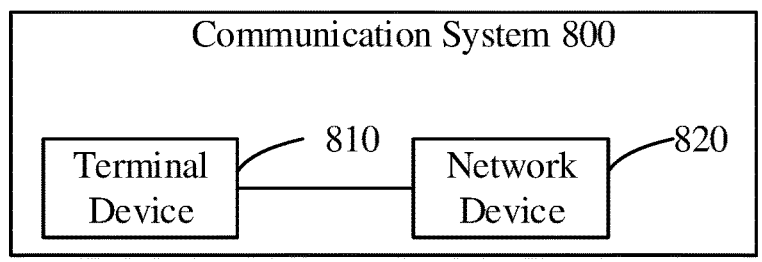
FIG. 11 is a schematic diagram showing a structure of a communication system according to an embodiment of the present disclosure.

FIG. 11 is a schematic block diagram of a communication system 800 according to an embodiment of the present disclosure. The communication system 800 includes a terminal device 810 and a network device 820.

The network device 820 transmits first indication information to the terminal device 810.

The terminal device 810 receives the first indication information, and determines a first offset parameter value based on the received first indication information. The first offset parameter value is used to determine a timing relationship of transmission.

Here, the terminal device 810 can be configured to implement the corresponding functions implemented by the terminal device in the method according to any of the embodiments of the present disclosure, and the network device 820 can be configured to implement the corresponding functions implemented by the network device in the method according to any of the embodiments of the present disclosure. For the sake of brevity, details thereof will be omitted here.

The above embodiments may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or any other programmable device. The computer instructions may be stored in a computer-readable storage medium, or transmitted from one computer-readable storage medium to another. For example, the computer instructions may be transmitted from a website, computer, server, or data center to another website, computer, server, or data center via wired communication (e.g., coaxial cable, optical fiber, or Digital Subscriber Line (DSL)) or wireless communication (e.g., infrared, wireless, microwave, etc.). The computer-readable storage medium may be any available medium that can be accessed by a computer, or a data storage device including one or more available mediums, such as a server, a data center, etc. The available mediums may include magnetic mediums (e.g., floppy disks, hard disks, magnetic tapes), optical medium (e.g., Digital Video Disc (DVD)), or semiconductor mediums (e.g., Solid State Disk (SSD)), etc.

It can be appreciated that, in the embodiments of the present disclosure, the numbering of the above processes does not necessarily mean their execution order. The execution order of the processes should be determined based on their functions and internal logics. The implementations of the embodiments of the present disclosure are not limited to any specific execution order.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. An information transmission method, applied in a terminal device, the method comprising:
   receiving, by the terminal device, first indication information; and
   determining, by the terminal device, a first offset parameter value based on the received first indication information, wherein the first offset parameter value is used to determine a timing relationship of transmission,
   wherein the first indication information comprises first parameter information, and
   said determining, by the terminal device, the first offset parameter value based on the first indication information comprises:
   determining, by the terminal device based on a second mapping, an offset parameter value corresponding to the first parameter information in the first indication information as the first offset parameter value,
   wherein the second mapping comprises a correspondence between at least one parameter information and at least one offset parameter value.

2. The method according to claim 1, wherein said determining, by the terminal device, the first offset parameter value based on the first indication information comprises:
   determining, by the terminal device based on a first mapping, an offset parameter value corresponding to the first indication information as the first offset parameter value,
   wherein the first mapping comprises a correspondence between at least one indication information and at least one offset parameter value.

3. The method according to claim 1, wherein
the first mapping is predetermined or configured by a network device.

4. The method according to claim 1, wherein
the first parameter comprises at least one of the following types of parameters: subcarrier spacing, cell identification, beam identification, Synchronization Signal Block (SSB) identification, satellite scenario, satellite altitude, transmission type, whether a Radio Resource Control (RRC) parameter configuration is completed.

5. The method according to claim 1, wherein
the second mapping is predetermined or configured by a network device.

6. The method according to claim 4, wherein
the satellite scenario comprises at least one of a Low Earth Orbit (LEO) scenario, a Medium Earth Orbit (MEO) scenario, a Geostationary Earth Orbit (GEO) scenario, or a High Elliptical Orbit (HEO) scenario, and/or
the satellite altitude is 600 km or 1200 km, and/or
the transmission type comprises at least one of: Physical Uplink Shared Channel (PUSCH) transmission, Physical Uplink Control Channel (PUCCH) transmission, third-step message (MSG3) PUSCH transmission, Medium Access Control (MAC) Control Element (CE) command transmission, Channel State Information (CSI) reference resource, aperiodic channel Sounding Reference Signal (SRS) transmission, or Physical Random Access Channel (PRACH) transmission.

7. The method according to claim 1, wherein
the first indication information is carried in at least one of: Radio Resource Control (RRC) signaling, MAC CE, or Downlink Control Information (DCI), and/or
the first indication information is transmitted via a system message, and/or
the first indication information is transmitted via a Random Access Response (RAR) grant message, and/or
the first indication information is transmitted via a DCI, wherein the DCI is used for scheduling an RAR grant.

8. The method according to claim 1, wherein the terminal device belongs to a first cell, a first network device belongs to the first cell, and the first indication information is transmitted from the first network device:
   the first offset parameter value comprises an offset parameter value corresponding to the first cell, and the method further comprises: performing, by the terminal device based on the first offset parameter value, uplink transmission to the first network device; and/or
   a second network device belongs to a second cell, the first offset parameter value comprises an offset parameter value corresponding to the second cell, and the method further comprises:

performing, by the terminal device based on the first offset parameter value, uplink transmission to the second network device.

9. The method according to claim 1, wherein
the first offset parameter value is determined based on a first subcarrier spacing, and the first offset parameter value is in units of slot or symbol; or
the first offset parameter value is in units of at least one of: subframe, half-frame, frame, millisecond, or second.

10. The method according to claim 1, wherein the timing relationship of transmission comprises at least one of:
transmission timing relationship of Physical Uplink Shared Channel (PUSCH) scheduled by Downlink Control Information (DCI);
transmission timing relationship of PUSCH scheduled by Random Access Response (RAR) grant;
transmission timing relationship of Hybrid Automatic Repeat-request Acknowledgement (HARQ-ACK) transmission on Physical Uplink Control Channel (PUCCH);
activation timing relationship of Media Access Control (MAC) Control Element (CE);
CSI reference resource timing relationship; or
transmission timing relationship of aperiodic Sounding Reference Signal (SRS).

11. The method according to claim 1, wherein
the first offset parameter value comprises an offset value between a downlink slot and an uplink slot that are associated with a same slot number at a network device side.

12. An information transmission method, applied in a network device, the method comprising:
transmitting, by the network device, first indication information to a terminal device,
wherein the first indication information is used for the terminal device to determine a first offset parameter value based on the first indication information, and the first offset parameter value is used for the terminal device to determine a timing relationship of transmission,
wherein the first indication information comprises first parameter information, the terminal device determining the first offset parameter value based on the first indication information comprises:
determining, by the terminal device based on a second mapping, an offset parameter value corresponding to the first parameter information in the first indication information as the first offset parameter value,
wherein the second mapping comprises a correspondence between at least one parameter information and at least one offset parameter value.

13. The method according to claim 12, wherein
the network device configures a first mapping for the terminal device, the first mapping comprising a correspondence between at least one indication information and at least one offset parameter value.

14. The method according to claim 12, wherein
the first offset parameter value is determined based on a first subcarrier spacing, and the first offset parameter value is in units of slot or symbol; or
the first offset parameter value is in units of at least one of: subframe, half-frame, frame, millisecond, or second.

15. The method according to claim 12, wherein the terminal device belongs to a first cell, and the network device belongs to the first cell:
the first offset parameter value comprises an offset parameter value corresponding to the first cell for uplink transmission of the terminal device to the network device; and/or
a second network device belongs to a second cell, and the first offset parameter value comprises an offset parameter value corresponding to the second cell for uplink transmission of the terminal device to the second network device.

16. The method according to claim 12, wherein the timing relationship of transmission comprises at least one of:
transmission timing relationship of Physical Uplink Shared Channel (PUSCH) scheduled by Downlink Control Information (DCI);
transmission timing relationship of PUSCH scheduled by Random Access Response (RAR) grant;
transmission timing relationship of Hybrid Automatic Repeat-request Acknowledgement (HARQ-ACK) transmission on Physical Uplink Control Channel (PUCCH);
activation timing relationship of Media Access Control (MAC) Control Element (CE);
CSI reference resource timing relationship; or
transmission timing relationship of aperiodic Sounding Reference Signal (SRS).

17. The method according to claim 12, wherein
the first offset parameter value comprises an offset value between a downlink slot and an uplink slot that are associated with a same slot number at the network device.

18. A terminal device, comprising a processor and a memory, wherein the memory has a computer program stored thereon, and the processor is configured to invoke and execute the computer program stored in the memory to:
receive first indication information; and
determine a first offset parameter value based on the received first indication information, wherein the first offset parameter value is used to determine a timing relationship of transmission,
wherein the first indication information comprises first parameter information, and said determining the first offset parameter value based on the first indication information comprises:
determining, based on a second mapping, an offset parameter value corresponding to the first parameter information in the first indication information as the first offset parameter value,
wherein the second mapping comprises a correspondence between at least one parameter information and at least one offset parameter value.

19. A network device, comprising a processor and a memory, wherein the memory has a computer program stored thereon, and the processor is configured to invoke and execute the computer program stored in the memory to perform the steps in the information transmission method according to claim 12.

* * * * *